United States Patent [19]

Kenik

[11] Patent Number: 4,538,445
[45] Date of Patent: Sep. 3, 1985

[54] LIQUID FLOW METER

[75] Inventor: Frank W. Kenik, Wadswarth, Ill.

[73] Assignee: Outboard Marine Corporation, Waukegan, Ill.

[21] Appl. No.: 530,505

[22] Filed: Sep. 9, 1983

[51] Int. Cl.³ .................. G01F 25/00; G01M 19/00
[52] U.S. Cl. ................................. 73/3; 73/168; 73/861
[58] Field of Search .................. 73/3, 168, 861

[56] References Cited

U.S. PATENT DOCUMENTS

| 3,179,291 | 4/1965 | Umbach et al. | 73/168 X |
| 4,171,638 | 10/1979 | Coman et al. | 73/168 X |
| 4,322,972 | 4/1982 | Karjala | 73/168 |

FOREIGN PATENT DOCUMENTS 2057283  4/1981  United Kingdom ............ 73/3

Primary Examiner—Charles A. Ruehl
Attorney, Agent, or Firm—Michael, Best & Friedrich

[57] ABSTRACT

A meter for measuring liquid flow rates to a device under test has a liquid supply tank connected to the device by a conduit and also has a test standpipe having a uniform internal diameter connected to the device by a conduit as well as also being connected to the tank by a conduit. A shutoff valve is located in each conduit. This allows the standpipe to be connected to the supply to raise the level for the start of a test. During the test only the standpipe supplies the device so the level at the end of the test is subtracted from the starting level to indicate the volume consumed. When a test is not in progress the device is supplied from the tank.

8 Claims, 1 Drawing Figure

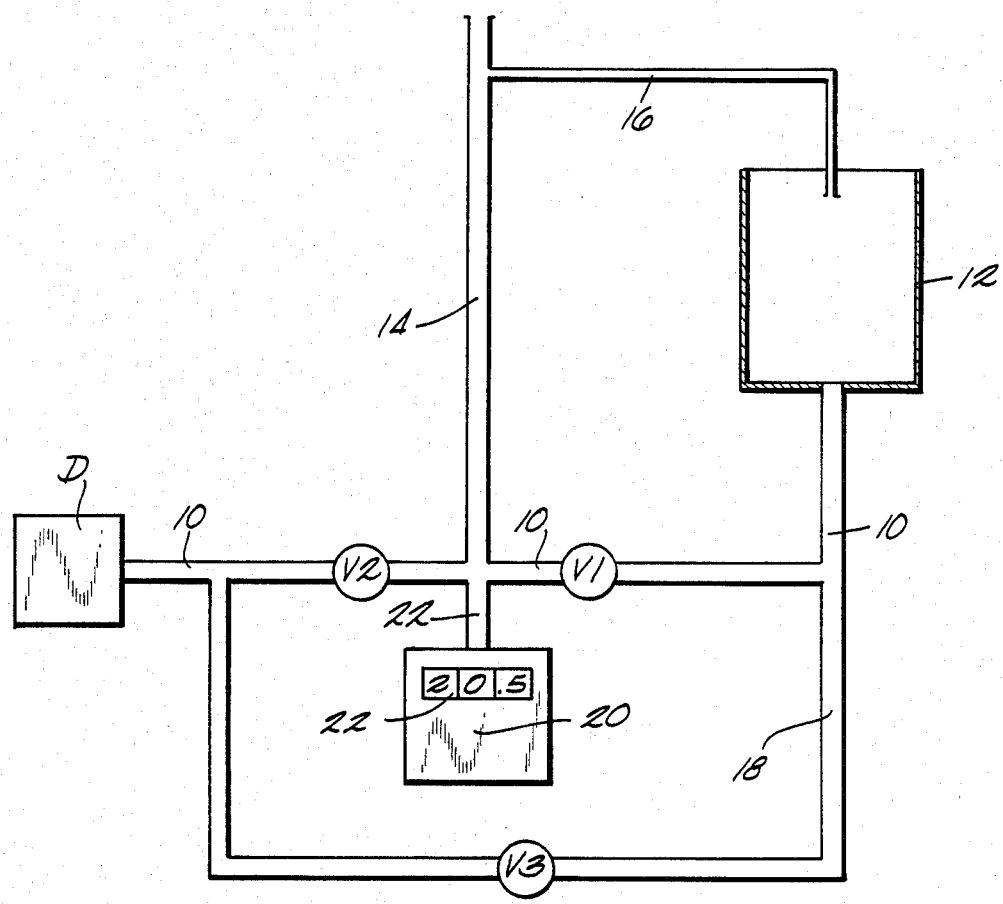

LIQUID FLOW METER

FIELD OF THE INVENTION

This invention relates to measurement of liquid flow rates and particularly very low flow rates.

BACKGROUND OF THE INVENTION

Precision measurement of low fuel flow rates has to this time required expensive equipment subject to instability at the low end of the fuel flow rates as well as being subject to loss of calibration. The equipment has generally entailed high pressure drops across the sensor and this adversely affected the equipment under test.

SUMMARY OF THE INVENTION

A feature of this invention is to provide a meter for measuring liquid flow rates to a device under test. A liquid supply tank is connected to the device by a conduit and a test standpipe having a uniform internal diameter is also connected to the device by a conduit as well as being connected to the tank by a conduit. A shutoff valve is located in each conduit. This allows the standpipe to be connected to the supply to raise the level for the start of a test. During the test only the standpipe supplies the device so the level at the end of the test is subtracted from the starting level to indicate the volume consumed. When a test is not in progress the device is supplied from the tank.

Another feature is the determination of the starting and finishing levels by a pressure transducer which responds to the pressure head in the standpipe and converts the net reading (before minus after) to a volume. The volume is easily derived since the standpipe has a uniform internal diameter and contains a known volume for any given length of liquid in the tube.

With this device very low flow rates can be determined accurately. It was designed to test oil pumps which pump oil for mixture with gasoline to fuel 2 cycle outboard motors (instead of using a pre-mix of gas and oil). Each production motor is tested to make certain the pump is working properly. The flow rate is very small.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

The single FIGURE is a schematic showing of the meter.

DETAILED DESCRIPTION OF THE DRAWINGS

The metering arrangement shown in the drawing is designed to measure the flow rate to a device D under test to determine whether it is functioning correctly. This equipment is designed for use as a production check and could be used in the field as a service or trouble shooting aid.

Conduit 10 leads from the bottom of the supply tank 12 to the device D and has shutoff valves V1 and V2 spaced in the conduit. Vertically disposed standpipe or tube 14 is connected to conduit 10 between valves V1 and V2. The tube has a uniform internal diameter (ID). The upper end of the standpipe is open to vent the tube and has an overflow tube 16 positioned to empty into the tank 12. If V1 and V2 are open, the level in the tube 14 will be the same as the level in the supply tank and device D will be connected to the tank.

By-pass conduit 18 leads from a point upstream of V1 to a point downstream of V2 and has a shutoff valve V3 to cut off the by-pass. If V1 and V2 are open, the device D under test and the standpipe 14 will be supplied with liquid whether or not V3 is open. If V3 is open an adequate supply to the standpipe is assured and the level in the tube can stabilize. If initial level L1 is noted by means of a mark, a ruler or a transducer to be described and V1 and V3 are closed the device D must draw liquid from the tube. After some time period the test can be concluded by closing V2 and opening V3 to continue the liquid supply to the device. The final level L2 in the tube is noted and the difference between L1 and L2 will give the volume used during the test because a liquid column of given diameter (the internal diameter of the tube) and length will be a specific volume.

L1 and L2 can be determined with a ruler or the levels can be determined by means of a pressure transducer 20 connected to conduit 10 by conduit 22. This transducer 20 connected to conduit 10 by conduit 22. This transducer can accurately determine pressure which can readily be translated into height of the column in tube 14. The starting level L1 and end level L2 can be determined electronically as can the difference which can be displayed as a difference in height or can be translated into a direct volume rading as indicated in window 22. Thus, given a uniform internal tube diameter the volume used can be determined by means of the transducer or ruler. Another test could time how long the device D takes to consume a specified amount.

Tubes having different internal diameters can be used to match the equipment to the device under test. Multiple tubes having different internal diameters can be used.

After the test is completed and the volume has been determined V1 and V2 are opened to replenish the standpipe. When the level stabilizes in the tube, it is noted (manually or electronically with the transducer 20) and V1 and V3 are closed causing the device D to draw only from the test pipe 14. At the end of the test V2 is closed and V3 is opened to continue liquid supply to the device D. Closure of V2 isolates the tube 14 until the L2 reading is made. Then V1 and V2 are opened to prepare for the next test. If V2 were not opened there would be some risk of trapping air leading to false readings.

The valves can be electrically operated and the sequencing can be programed. And the program can easily include determination of L1 and L2.

I claim:

1. A meter for measuring liquid flow rates, said meter comprising a supply tank having a top and a bottom, conduit means connecting said tank to a point of use, a test standpipe including a lower end connected to said conduit means and an upper end open to the atmosphere and connected to said top of said supply tank, said standpipe having a uniform internal diameter and being adapted to contain a known quantity of liquid per unit of length, valve means in said conduit means operative to supply liquid to the point of use either from said tank or said standpipe for a test run and also operative to connect said standpipe to said tank to raise the liquid level in said standpipe to that in said tank prior to a test run, and means for determining the liquid level in said standpipe at the start and end of a test run.

2. A meter for measuring liquid flow rates, said meter comprising a supply tank, conduit means connecting the tank to a point of use, a test standpipe connected to said conduit means, said standpipe having a uniform internal diameter and being adapted to contain a known quantity of liquid per unit of length, valve means in said conduit means operative to supply liquid to the point of use either from said tank or said standpipe for a test run and also operative to connect said standpipe to said tank to raise the level in said standpipe to that in said tank prior to a test run, said valve means including a first valve in said conduit means upstream of said standpipe, a second valve in said conduit means downstream of said standpipe, a by-pass conduit from a point upstream of said first valve to a point downstream of said second valve, said valve means also including a third valve in said by-pass conduit, and means for determing the level in said standpipe at the start and end of a test run.

3. A meter according to claim 2 wherein said means for determining the level in said standpipe is responsive to the pressure head in said standpipe.

4. A meter according to claim 3 wherein said pressure responsive means is a transducer which converts the pressure head to a liquid level reading.

5. A meter for measuring liquid flow rates, said meter comprising a supply tank, a first conduit connecting said tank to a device under test, a test standpipe having a uniform internal diameter, a second conduit extending in by-passing relation to said first conduit and including a first branch conduit connecting said standpipe to the device, and a second branch conduit connecting said standpipe to said supply tank, and a shutoff valve in said first conduit and in each of said branch conduits.

6. A meter according to claim 5 and including means for determining the liquid level in said standpipe at the start and end of a test whereby the volume consumed during the test can be determined.

7. A meter for measuring liquid flow rates, said meter comprising a supply tank, a conduit from said supply tank to the point of use of the liquid, first and second shutoff valves spaced apart in said conduit, a standpipe connected to said conduit between said valves, means for measuring the height of liquid in said standpipe by measuring the pressure in said standpipe, a by-pass line connected to said conduit between said first shutoff valve and said supply tank and between said second shutoff valve and the point of use, and a third shutoff valve located in said by-pass line.

8. The method of using the apparatus of claim 7 comprising opening all of said shutoff valves to establish flow to a device under test and to determine a starting level in said standpipe, closing the first and third shutoff valves to require the device under test to draw liquid from said standpipe through said second shutoff valve, closing the second shutoff valve to permit determination of the level in said standpipe at the end of a test, and opening said third shutoff valve to establish flow to the device under test.

* * * * *